(12) United States Patent
Lee et al.

(10) Patent No.: US 12,260,790 B2
(45) Date of Patent: Mar. 25, 2025

(54) DISPLAY PANEL AND DISPLAY APPARATUS HAVING THE SAME

(71) Applicant: SAMSUNG ELECTRONICS CO., LTD., Suwon-si (KR)

(72) Inventors: Changjoon Lee, Suwon-si (KR); Seongho Son, Suwon-si (KR); Jongsung Lee, Suwon-si (KR); Jinyoung Kim, Suwon-si (KR); Youngki Jung, Suwon-si (KR)

(73) Assignee: SAMSUNG ELECTRONICS CO., LTD., Suwon-si (KR)

( * ) Notice: Subject to any disclaimer, the term of this patent is extended or adjusted under 35 U.S.C. 154(b) by 0 days.

(21) Appl. No.: 17/942,775

(22) Filed: Sep. 12, 2022

(65) Prior Publication Data

US 2023/0177986 A1 Jun. 8, 2023

Related U.S. Application Data

(63) Continuation of application No. PCT/KR2022/013366, filed on Sep. 6, 2022.

(30) Foreign Application Priority Data

Dec. 8, 2021 (KR) .................. 10-2021-0175171

(51) Int. Cl.
*G09G 3/00* (2006.01)
*G06F 3/14* (2006.01)
*G09G 3/32* (2016.01)

(52) U.S. Cl.
CPC ........... *G09G 3/006* (2013.01); *G06F 3/1446* (2013.01); *G09G 3/32* (2013.01);
(Continued)

(58) Field of Classification Search
CPC .... G09G 3/006; G09G 3/32; G09G 2300/026; G09G 2300/0426; G09G 2330/04; G09G 2330/12; G06F 3/1446
(Continued)

(56) References Cited

U.S. PATENT DOCUMENTS 7,822,469 B2 10/2010 Lo
9,899,832 B2 2/2018 Kuo
(Continued)

FOREIGN PATENT DOCUMENTS

JP 11-109887 A 4/1999
KR 10-2001-0055970 A 7/2001
(Continued)

OTHER PUBLICATIONS

International Search Report (PCT/ISA/210), dated Jan. 5, 2023, issued by the International Searching Authority in International Application No. PCT/KR2022/013366.
(Continued)

*Primary Examiner* — Jason M Mandeville
(74) *Attorney, Agent, or Firm* — Sughrue Mion, PLLC

(57) ABSTRACT

A display panel in which a resistance structure is provided on a test pattern to prevent a circuit of the display panel from being damaged by static electricity introduced into the test pattern, and a display apparatus having the same are provided. The display panel includes: a substrate; a plurality of pixel circuits provided on the substrate and configured to drive a plurality of inorganic light emitting devices; a test line provided on the substrate and extending from an edge of the substrate; an insulating layer provided on the test line; and a resistance structure provided on the test line, the resistance structure including: at least two vertical interconnect accesses (vias) passing through the insulating layer, and a resistance layer provided on the insulating layer and
(Continued)

extending between the at least two vias, wherein the at least two vias connect the test line and the resistance layer to each other, and the test line is discontinuous at an area between the at least two vias, and wherein the resistance layer is configured to receive, through one of the at least two vias, a current applied to the test line.

12 Claims, 17 Drawing Sheets

(52) U.S. Cl.
CPC ............. *G09G 2300/026* (2013.01); *G09G 2300/0426* (2013.01); *G09G 2330/04* (2013.01); *G09G 2330/12* (2013.01)

(58) Field of Classification Search
USPC .......................................................... 345/55
See application file for complete search history.

(56) References Cited

U.S. PATENT DOCUMENTS

| 10,930,231 | B2 | 2/2021 | Kim et al. |
| 11,107,869 | B2 | 8/2021 | Lee et al. |
| 2015/0235913 | A1* | 8/2015 | In ..................... H01L 27/124 |
| | | | 257/48 |
| 2020/0006452 | A1* | 1/2020 | Lee ..................... H10K 59/131 |
| 2020/0125314 | A1* | 4/2020 | Cho ..................... G06F 3/1431 |
| 2020/0265777 | A1* | 8/2020 | Shigeta ............... G09G 3/2081 |
| 2023/0006120 | A1 | 1/2023 | Jung et al. |

FOREIGN PATENT DOCUMENTS

| KR | 10-1032439 B1 | 5/2011 |
| KR | 10-2019-0023876 A | 3/2019 |
| KR | 10-2020-0003955 A | 1/2020 |
| KR | 10-2196179 B1 | 12/2020 |
| KR | 10-2021-0112815 A | 9/2021 |

OTHER PUBLICATIONS

Written Opinion (PCT/ISA/237), dated Jan. 5, 2023, issued by the International Searching Authority in International Application No. PCT/KR2022/013366.

* cited by examiner

DISPLAY PANEL AND DISPLAY APPARATUS HAVING THE SAME

CROSS-REFERENCE TO RELATED APPLICATION(S)

This application is a by-pass continuation of International Application No. PCT/KR2022/013366, filed on Sep. 6, 2022, which is based on and claims priority to Korean Patent Application No. 10-2021-0175171, filed on Dec. 8, 2021, in the Korean Intellectual Property Office, the disclosure of which is incorporated by reference herein in its entirety.

BACKGROUND

1. Field

The disclosure relates to a display panel for implementing an image using an inorganic light emitting device and a display apparatus having the same.

2. Description of Related Art

A display apparatus may be classified into a light-emissive display in which each pixel emits light by itself and a non-emissive display that requires a separate light source.

A liquid crystal display (LCD) is a typical non-emissive display, and needs a backlight unit configured to supply light from the rear of a display panel, a liquid crystal layer configured to serve as a switch to transmit/block light, a color filter configured to change supplied light to a desired color, and the like. Thus, the LCD is complex in structure and has a limitation in realizing a small thickness.

On the other hand, in the light emissive display in which each pixel emits light by itself by including a light-emitting device for each pixel, components such as a backlight unit and a liquid crystal layer are not required and a color filter can also be omitted. Thus, the light emissive light emissive display is structurally simple and can have a high degree of freedom in design. In addition, the light emissive display may realize not only a small thickness, but also an excellent contrast ratio, brightness, and viewing angle.

Among light emissive displays, a micro-light-emitting diode (LED) display is composed of a plurality of LEDs having a size of micrometers. In comparison with the LCD that requires a backlight, the micro-LED display may provide better contrast, response time, and energy efficiency.

Further, the micro-LED, which is an inorganic light-emitting device, has higher brightness, better light emission efficiency, and a longer lifespan in comparison with an organic light-emitting diode (OLED), which requires a separate encapsulation layer for protecting organic materials.

SUMMARY

Provided are a display panel in which a resistance structure is provided on a test pattern to prevent a circuit of the display panel from being damaged by static electricity introduced into the test pattern, and a display apparatus having the same.

Further, provided are a display panel in which a separate resistance element is not used but a via is formed in a layer structure stacked on a test pattern to change a path through which a current flows, so that a circuit of the display panel is prevented from being damaged by static electricity introduced into the test pattern, and a display apparatus having the same.

According to an aspect of the disclosure, a display panel includes: a substrate; a plurality of pixel circuits provided on the substrate and configured to drive a plurality of inorganic light emitting devices: a test line provided on the substrate and extending from an edge of the substrate: an insulating layer provided on the test line; and a resistance structure provided on the test line, the resistance structure including: at least two vertical interconnect accesses (vias) passing through the insulating layer; and a resistance layer provided on the insulating layer and extending between the at least two vias, wherein the at least two vias connect the test line and the resistance layer to each other, and the test line is discontinuous at an area between the at least two vias, and wherein the resistance layer is configured to receive, through one of the at least two vias, a current applied to the test line.

The resistance layer may include a material having a resistance higher than a resistance of a material of the test line.

The resistance layer may include a resistance section corresponding to an area at which the test line is discontinuation, and the at least two vias may be connected to opposite end portions of the resistance section.

The resistance structure may be configured to open due to an electro static discharge (ESD) current applied to the test line and introduced from the test line into the resistance section through the one of the at least two vias.

The resistance layer may include at least one of polysilicon, silicon oxide, silicon nitride, silicon oxynitride, aluminum oxide, aluminum nitride, titanium oxide, or titanium nitride.

The display panel may further include a signal line connected to the plurality of pixel circuits, and the resistance structure may be provided between the edge of the substrate and a point at which the test line and the signal line cross each other.

The test line may have a cut surface corresponding to the edge of the substrate.

According to an aspect of disclosure, a display apparatus includes: a substrate; a plurality of inorganic light emitting devices provided on the substrate: a plurality of pixel circuits provided on the substrate and configured to drive the plurality of inorganic light emitting devices: a test line provided on the substrate and extending from an edge of the substrate: an insulating layer provided on the test line; and a resistance structure provided on the test line, the resistance structure including: at least two vertical interconnect accesses (vias) passing through the insulating layer; and a resistance layer provided on the insulating layer and extending between the at least two vias, wherein the at least two vias connect the test line and the resistance layer to each other, and the test line is discontinuous at an area between the at least two vias, and wherein the resistance layer is configured to receive, through one of the at least two vias, a current applied to the test line.

The resistance layer may include a material having a resistance higher than a resistance of a material of the test line.

The resistance layer may include a resistance section corresponding to an area at which the test line is discontinuation, and the at least two vias may be connected to opposite end portions of the resistance section.

The resistance structure may be configured to open due to an electro static discharge (ESD) current applied to the test line and introduced from the test line into the resistance section through the one of the at least two vias.

The resistance layer may include at least one of polysilicon, silicon oxide, silicon nitride, silicon oxynitride, aluminum oxide, aluminum nitride, titanium oxide, or titanium nitride.

The display apparatus may further include a signal line connected to the plurality of pixel circuits, and the resistance structure may be provided between the edge of the substrate and a point at which the test line and the signal line cross each other.

The test line may have a cut surface corresponding to the edge of the substrate.

Advantageous Effects

According to one aspect of the disclosure, a resistance structure is provided on a test pattern so that a circuit of the display panel can be prevented from being damaged by static electricity introduced into the test pattern.

According to another aspect of the disclosure, a via is formed in a layer structure stacked on a test pattern rather than using a separate resistance element to change a path through which a current flows, so that a circuit of the display panel can be prevented from being damaged by static electricity introduced into the test pattern.

BRIEF DESCRIPTION OF THE DRAWINGS

The above and other aspects, features, and advantages of certain embodiments of the present disclosure will be more apparent from the following description taken in conjunction with the accompanying drawings, in which.

DETAILED DESCRIPTION

Figure 1:
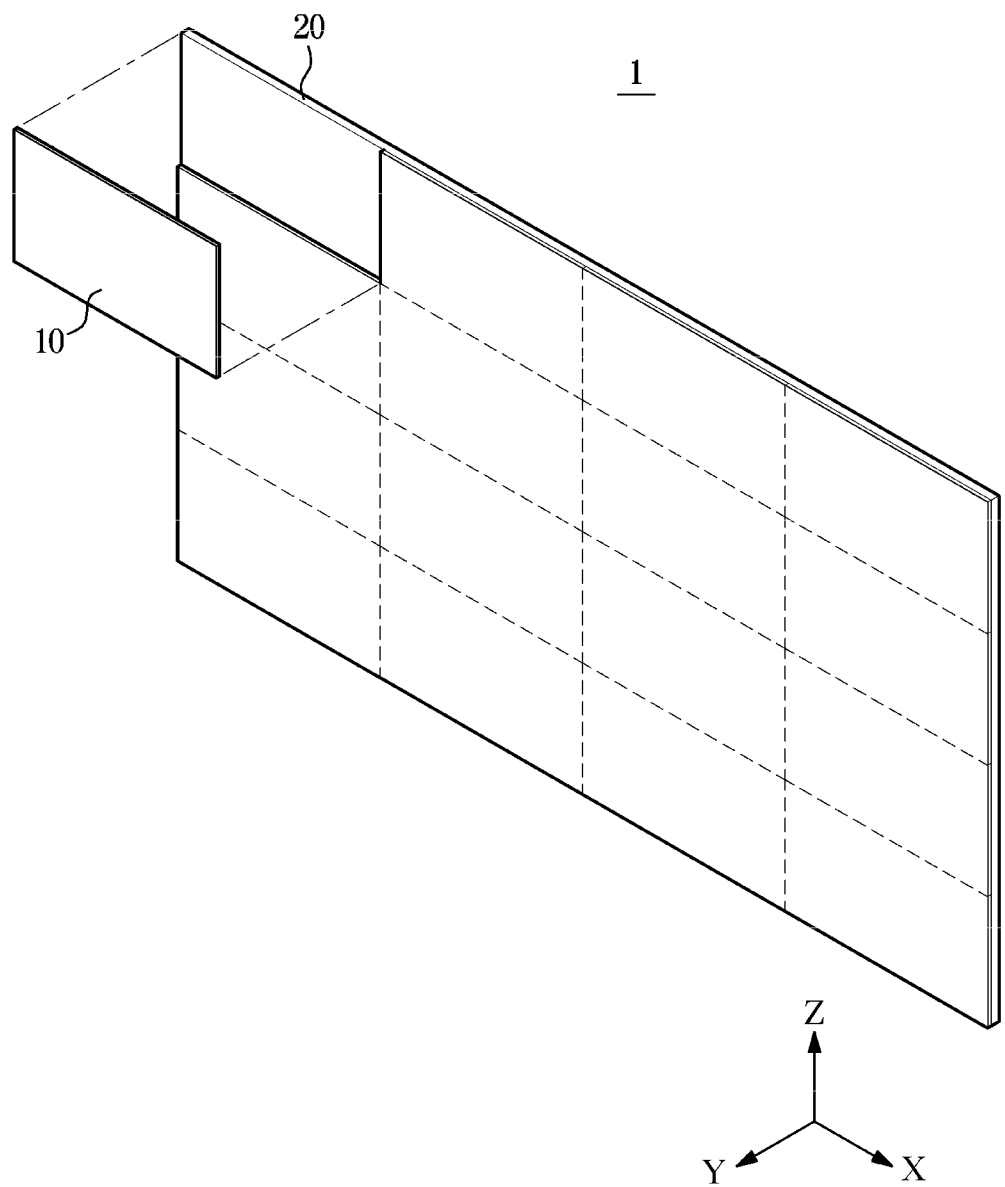
FIG. 1 is a perspective view illustrating an example of a display module and a display apparatus having the same according to an embodiment.

Embodiments are described in detail below with reference to the accompanying drawings. Like reference numerals denote like elements throughout the specification. In the specification, all elements of the embodiments are not described, and general contents in the art or repeated contents between the embodiments will not be described. Terms such as parts, modules, members, and blocks may be implemented using software or hardware, and a plurality of parts, modules, members, and blocks are implemented as a single element, or one part, module, member, or block may also include a plurality of elements.

Throughout the specification, when a part is referred to as being "connected" to another part, it includes "directly connected" to another part and "indirectly connected" to another part, and the "indirectly connected" to another part includes "connected" to another part through a wireless communication network, or electrically connected to another part through wiring, soldering, or the like.

In addition, when a part "includes" an element, another element may be further included, rather than excluding the existence of another element, unless otherwise described.

Throughout the specification, when a member is referred to as being "on" another member, the member is in contact with another member or yet another member is interposed between the two members.

Throughout the specification, when a member transmits or transfers a signal or data to another member, it does not preclude another member existing between the corresponding member and another member, and the signal or data is transmitted or transferred through another member unless otherwise described.

Through the specification, the expression of an ordinal number such as "first" and "second" is used to distinguish a plurality of members, and the used ordinal number does not indicate an arrangement order, a manufacturing order, importance, and the like of the members.

The singular expression includes a plural expression unless there are obvious exceptions in the context.

In each operation, an identification symbol is used to refer to each operation, the identification symbol does not limit the order of each operation, and each operation may be performed in an order different from the described order unless the context clearly indicates a specific order.

As used herein, expressions such as "at least one of," when preceding a list of elements, modify the combination of the elements. For example, the expression, "at least one of a, b, and c," should be understood as including only a, only b, only c, both a and b, both a and c, both b and c, or all of a, b, and c.

Hereinafter, a display module and a display apparatus including the display module according to one aspect will be described with reference to the accompanying drawings.

Figure 2:
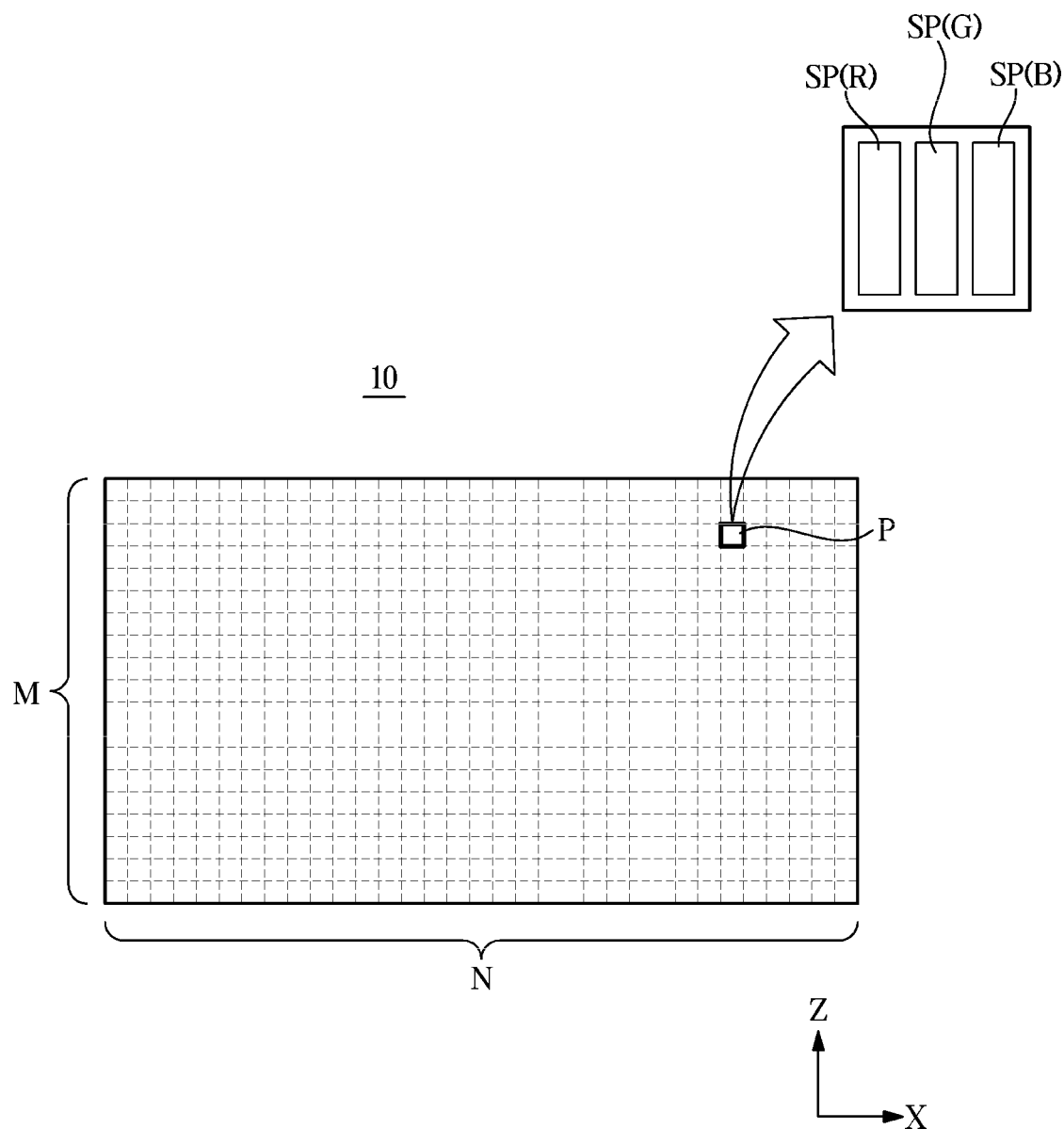
FIG. 2 is a diagram illustrating an example of an arrangement of pixels constituting a unit module of a display apparatus according to an embodiment.

FIG. 1 is a perspective view illustrating an example of a display module and a display apparatus having the same according to an embodiment, and FIG. 2 is a diagram illustrating an example of an arrangement of pixels constituting a unit module of a display apparatus according to an embodiment.

The display apparatus according to an embodiment is a self-emissive display apparatus in which a light emitting device is disposed in each of pixels so that the pixel may emit light by itself. Accordingly, unlike a liquid crystal display (LCD) apparatus, since the display apparatus according to an embodiment does not require components such as a backlight unit and a liquid crystal layer, a thin thickness may be implemented, a structure is simple, and thus a design may be variously changed.

In addition, in the display apparatus according to an embodiment, an inorganic light emitting device, such as an inorganic light emitting diode, may be used as the light emitting device disposed in each of the pixels. A response time of the inorganic light emitting device is faster than that of an organic light emitting device such as an organic light emitting diode (OLED), and the inorganic light emitting device may provide high brightness with low power.

In addition, unlike the organic light emitting device which requires an encapsulation process because it is vulnerable to exposure to moisture and oxygen and has low durability, the inorganic light emitting device does not require an encapsulation process and has high durability. Hereinafter, the inorganic light emitting device, which will be described in the following embodiment, denotes the inorganic light emitting diode.

The inorganic light emitting device used in the display apparatus according to an embodiment may be a micro-LED having a size in which a length of a short side is about 100 μm, about several tens of μm, or several μm. As described above, when the LED having a size of a micro unit is used, a pixel size may be reduced and a high-resolution may be implemented in the same size screen.

In addition, when an LED chip is manufactured in the size of a micro unit, a problem of being broken when bent due to properties of an inorganic material may be solved. That is, when the micro-LED chip is mounted onto a flexible substrate, the LED chip is not broken even when the substrate is bent, and thus a flexible display apparatus may also be implemented.

The display apparatus, in which the micro-LED is used, may be applied to various fields by using a very small pixel size and a thin thickness. As an example, as illustrated in FIG. 1, a plurality of display modules 10 onto which a plurality of micro-LEDs are mounted may be tiled to be fixed to a housing 20 so as to implement a large-area screen. A display apparatus having such a large-area screen may be used as a signage, an electronic board, and the like.

A three-dimensional coordinate system of XYZ-axes illustrated in FIG. 1 is based on the display apparatus 1, a plane on which a screen of the display apparatus 1 is positioned is an XZ-plane, and a direction in which an image is output or a direction in which an inorganic light emitting device emits light is a +Y direction. Since the coordinate system is based on the display apparatus 1, the same coordinate system may be applied to both of cases in which the display apparatus 1 is lying flat and in which the display apparatus 1 is in a standing state.

Generally, since the display apparatus 1 is used in a standing state, and a user watches an image from the front of the display apparatus 1, the +Y direction in which the image is output may be referred to as a forward direction, and the opposite direction may be referred to as a rearward direction.

In addition, the display apparatus 1 is generally manufactured in a lying state. Accordingly, a −Y direction of the display apparatus 1 may be referred to as a downward direction and the +Y direction may be referred to as an upward direction. That is, in an embodiment, which will be described below, the +Y direction may also be referred to as an upward direction or forward direction, and the −Y direction may also be referred to as a downward direction or rearward direction.

Except for an upper surface and a lower surface of the display apparatus 1 or the display module 10 having a flat plate shape, all of the remaining four surfaces may be referred to as side surfaces regardless of a posture of the display apparatus 1 or the display module 10.

In FIG. 1, a case in which the display apparatus 1 includes a plurality of display modules to implement a large-area screen is illustrated, but embodiments of the display apparatus 1 are not limited thereto. The display apparatus 1 may include a single display module 10 and may be implemented as a television (TV), a wearable device, a portable device, a personal computer (PC) monitor, or the like.

Referring to FIG. 2, the display module 10 may include pixels of an M×N (M and N are integers greater than or equal to two) array i.e., a plurality of pixels which are two-dimensionally arranged. FIG. 2 conceptually illustrates an arrangement of pixels, and it should be understood that pixels of the display module 10 may be located not only an active area in which pixels are arranged but also a bezel area or wiring area on which an image is not displayed.

In the embodiment, a case in which some components are two-dimensionally arranged may include not only a case in which some components are arranged on the same plane but also a case in which some components are arranged on different planes parallel to each other. In addition, the case in which the corresponding components are arranged on the same plane does not denote that upper ends of the arranged components should be positioned on the same plane and may include a case in which the upper ends of the arranged components are positioned on different planes parallel to each other.

A pixel P may be formed with at least three subpixels which output light having different colors. For example, a single pixel P may be formed with three subpixels SP (R), SP (G) and SP (B)) respectively corresponding to red R, green G, and blue B. In this case, a red subpixel SP (R) may output red light, a green subpixel SP (G) may output green light, and a blue subpixel SP (B) may output blue light.

However, the pixel arrangement of FIG. 2 is only an example to which the display module 10 and the display apparatus 1 according to an embodiment are applicable, and subpixels may also be arranged along a Z-axis direction, and may not be arranged in a line, and subpixels may be implemented to have sizes that are different from each other. The sizes or arrangement types of the subpixels are not limited as long as a single pixel includes a plurality of subpixels to implement various colors.

In addition, the pixel P does not necessarily include the red subpixel SP (R) which outputs the red light, the green subpixel SP (G) which outputs the green light, and the blue subpixel SP (B) which outputs the blue light. The pixel may also include a subpixel which outputs yellow light or white light. That is, a color or type of light output from each subpixel and the number of subpixels are not limited.

Figure 3:
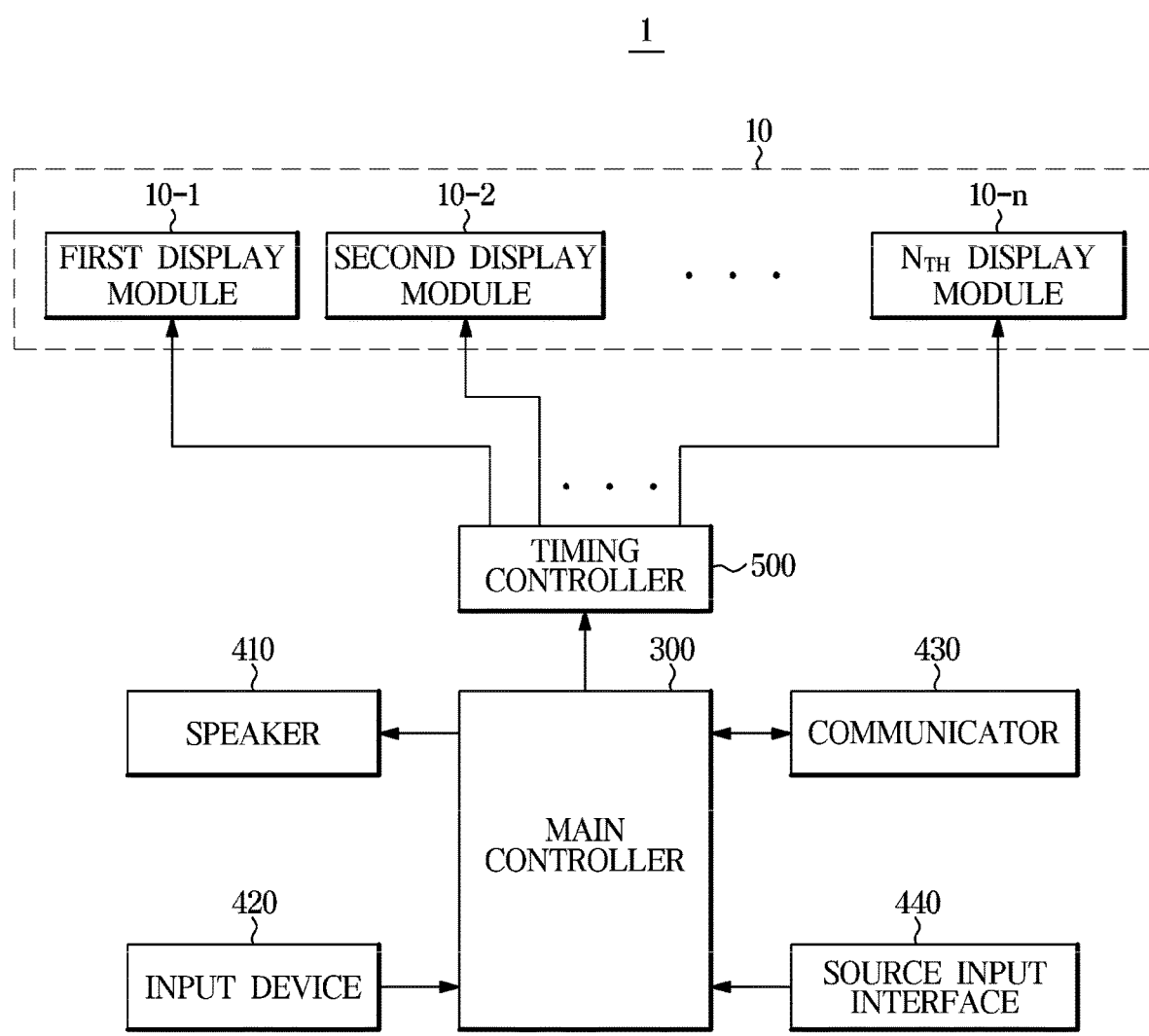
FIG. 3 is a block diagram illustrating a display apparatus according to an embodiment.

FIG. 3 is a block diagram illustrating a display apparatus according to an embodiment.

As illustrated in FIG. 1 above, the display apparatus 1 according to an embodiment may include a plurality of display modules 10 including a display module 10-1, a display module 10-2, . . . and a display module 10-n (n is an integer greater than or equal to two), a main controller 300 and a timing controller 500 which control the plurality of display modules 10, a communicator 430 which communicates with an external device, a source input interface 440 which receives a source image, a speaker 410 which outputs a sound, and an input device 420 which receives a command for controlling the display apparatus 1 from a user.

The input device 420 may also include a button or a touch pad provided in one area of the display apparatus 1, and in a case in which the display apparatus 1 is implemented using a touch screen, the input device 420 may include the touch pad provided on a front surface of the display apparatus 1. In addition, the input device 420 may also include a remote controller.

The input device 420 may receive various commands for controlling the display apparatus 1 from a user to perform power on/off, volume adjustment, channel adjustment, screen adjustment, various setting changes, and the like of the display apparatus 1.

The speaker 410 may be provided in one area of the housing 20 of the display apparatus 1, and a speaker module physically separated from the housing 20 may be additionally or alternatively provided.

The communicator 430 may communicate with a relay server or other electronic devices to transmit and receive relevant data. The communicator 430 may use at least one of various wireless communication methods such as 3rd Generation (3G), 4th Generation (4G), wireless local area net (LAN), Wi-Fi, Bluetooth, Zigbee, Wi-Fi Direct (WFD), ultra-wideband (UWB), Infrared Data Association (IrDA), Bluetooth Low Energy (BLE), near field communication (NFC), and Z-Wave. In addition, the communicator 430 may also use a wired communication method such as Peripheral Component Interconnect (PCI), PCI-express, or Universe Serial Bus (USB).

The source input interface 440 may receive a source signal input from a set-top box, a USB, an antenna, or the like. Accordingly, the source input interface 440 may include at least one selected from a source input interface group consisting of a High-Definition Multimedia Interface (HDMI) cable port, a USB port, an antenna port, and the like.

The source signal received by the source input interface 440 may be processed by the main controller 300 and converted into the form capable of being output from the display panel 100 (see FIG. 4) and the speaker 410.

The main controller 300 and the timing controller 500 may include at least one memory which stores a program including instructions for performing an operation, which will be described below, and various data, and at least one processor configured to execute the stored program.

The main controller 300 may process a source signal input through the source input interface 440 to generate an image signal corresponding to the input source signal.

For example, the main controller 300 may include a source decoder, a scaler, an image enhancer, and a graphic processor. The source decoder may decode a source signal compressed in a format such as Moving Picture Experts Group (MPEG) and the like, and the scaler may output image data of a desired resolution through resolution conversion.

The image enhancer may improve image quality of image data by applying various compensation techniques. The graphic processor may divide pixels of image data into red-green-blue (RGB) data to output together with a control signal, such as a syncing signal, for a display timing at the display panel 100. That is, the main controller 300 may output image data and a control signal which corresponds to a source signal.

The above-described operation of the main controller 300 is only an example applicable to the display apparatus 1, other operations may be further performed, and some operations among the above-described operations may be omitted.

The image data and the control signal output from the main controller 300 may be transmitted to the timing controller 500.

The timing controller 500 may generate various control signals such as a timing control signal for converting the image data transmitted from the main controller 300 to image data having the form that may be processed in a driver integrated circuit (IC) 200 (see FIG. 4) and displaying the image data on the display panel 100.

Although the display apparatus 1 according to an embodiment does not necessarily include the plurality of display modules 10, in the embodiments which will be described below, operations of the components will be specifically described using an example in which the display apparatus 1 includes the plurality of display modules 10 for description purposes.

Figure 4:
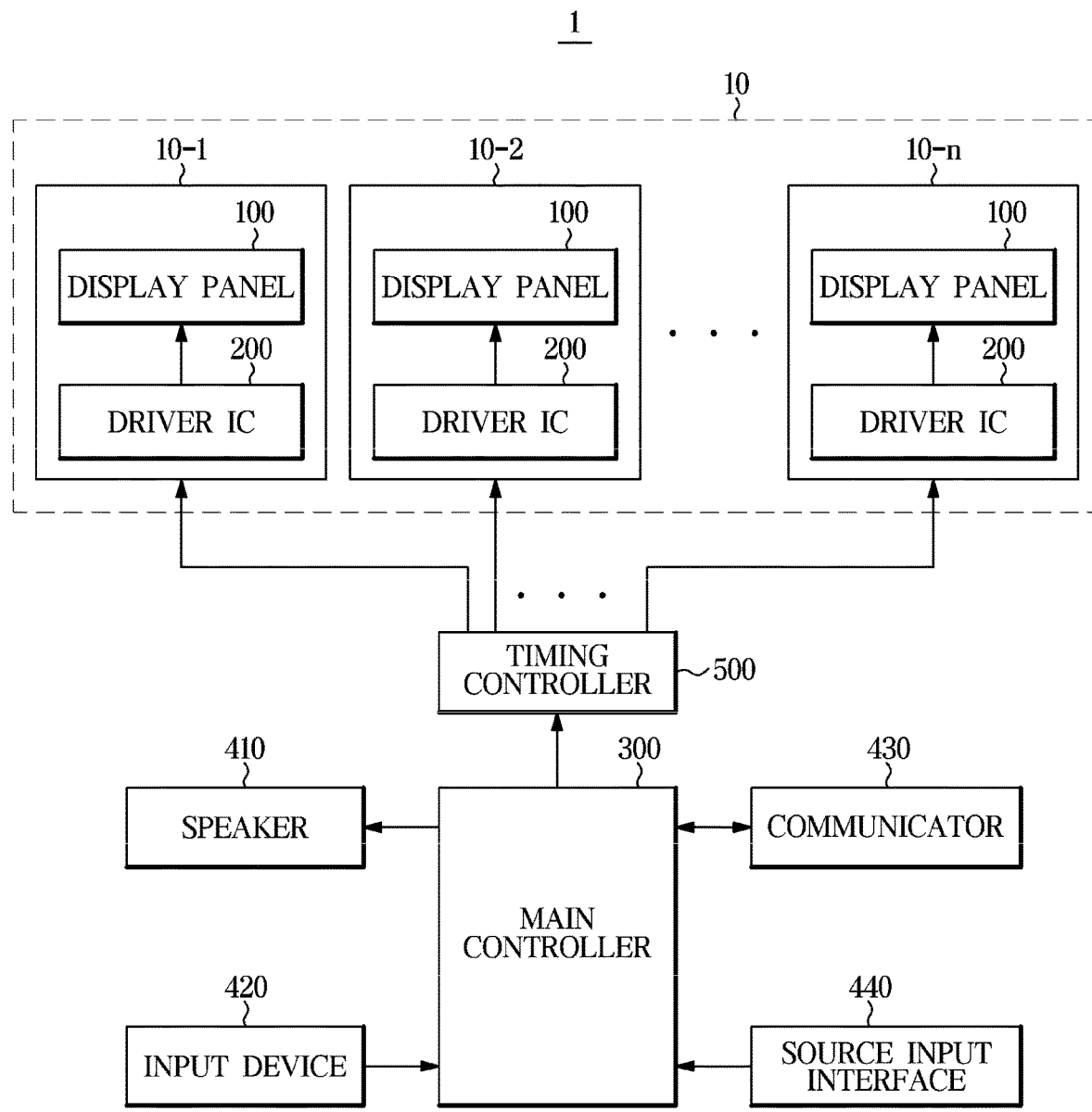
FIG. 4 is a detailed block diagram illustrating a configuration of a display module included in a display apparatus according to an embodiment.
Figure 5:
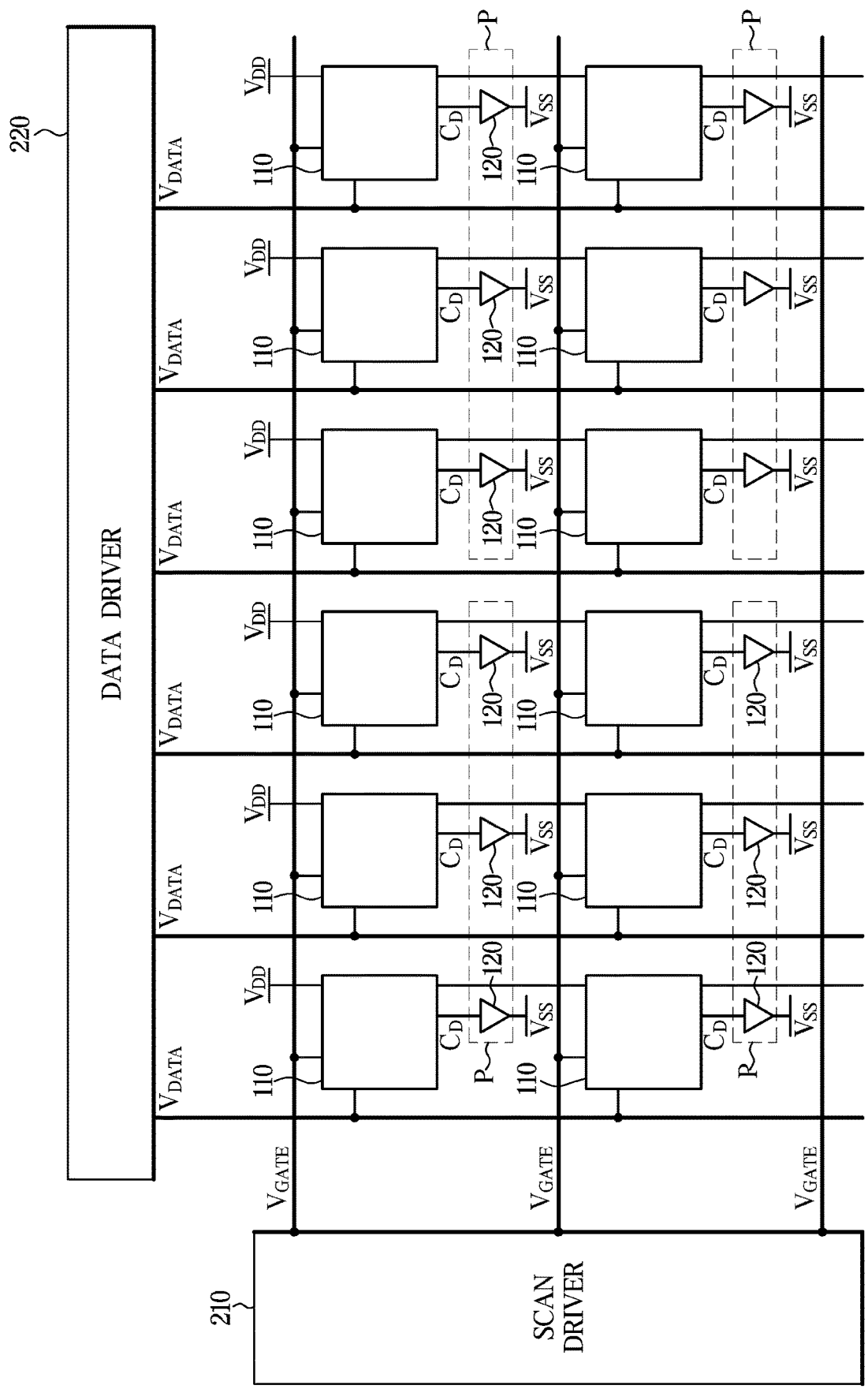
FIG. 5 is a diagram for conceptually describing a method in which each pixel is driven in a display module according to an embodiment.

FIG. 4 is a detailed block diagram illustrating a configuration of a display module included in a display apparatus according to an embodiment, and FIG. 5 is a diagram for conceptually describing a method in which each pixel is driven in a display module according to an embodiment.

Referring to FIG. 4, each OF the plurality of display modules 10-1, 10-2 . . . and 10-n may include the display panel 100 displaying an image and the driver IC 200 driving the display panel 100-1.

The driver IC 200 may generate a driving signal for the display panel 100 to display an image based on image data and a timing control signal transmitted from the timing controller 500.

The driving signal generated by the driver IC 200 may include a gate signal and a data signal, and the generated driving signal is input to the display panel 100.

As described above, the display apparatus 1 according to the embodiment is a self-emissive display apparatus. Accordingly, an inorganic light emitting device 120 emitting red, green, or blue light may be disposed in each of the sub-pixels.

Although the inorganic light emitting device 120 disposed in each subpixel may be driven in an active matrix (AM) or passive matrix (PM) manner, in the embodiment which will be described below, the case in which the inorganic light emitting device 120 is driven in the AM manner will be described as an example for the sake of description.

Referring to FIG. 5, the driver IC 200 may include a scan driver 210 and a data driver 220. The scan driver 210 may output a gate signal for turning on/off the subpixel, and the data driver 220 may output a data signal for implementing an image.

The scan driver 210 may generate a gate signal based on a timing control signal transmitted from the timing controller 500, and the data driver 220 may generate a data signal based on image data transmitted from the timing controller 500.

The display module 10 may include a pixel circuit 110 for individually controlling each inorganic light emitting device 120, and the gate signal output from the scan driver 210 and the data signal output from the data driver 220 may be input to the pixel circuit 110.

For example, when a gate voltage $V_{GATE}$, a data voltage $V_{DATA}$, and a power voltage $V_{DD}$ are input to the pixel circuit 110, the pixel circuit 110 may generate a driving current $C_D$ for driving the inorganic light emitting device 120.

The driving current $C_D$ output from the pixel circuit 110 may be input to the inorganic light emitting device 120, and the inorganic light emitting device 120 may emit light by the input driving current $C_D$ to implement an image.

Figure 6:
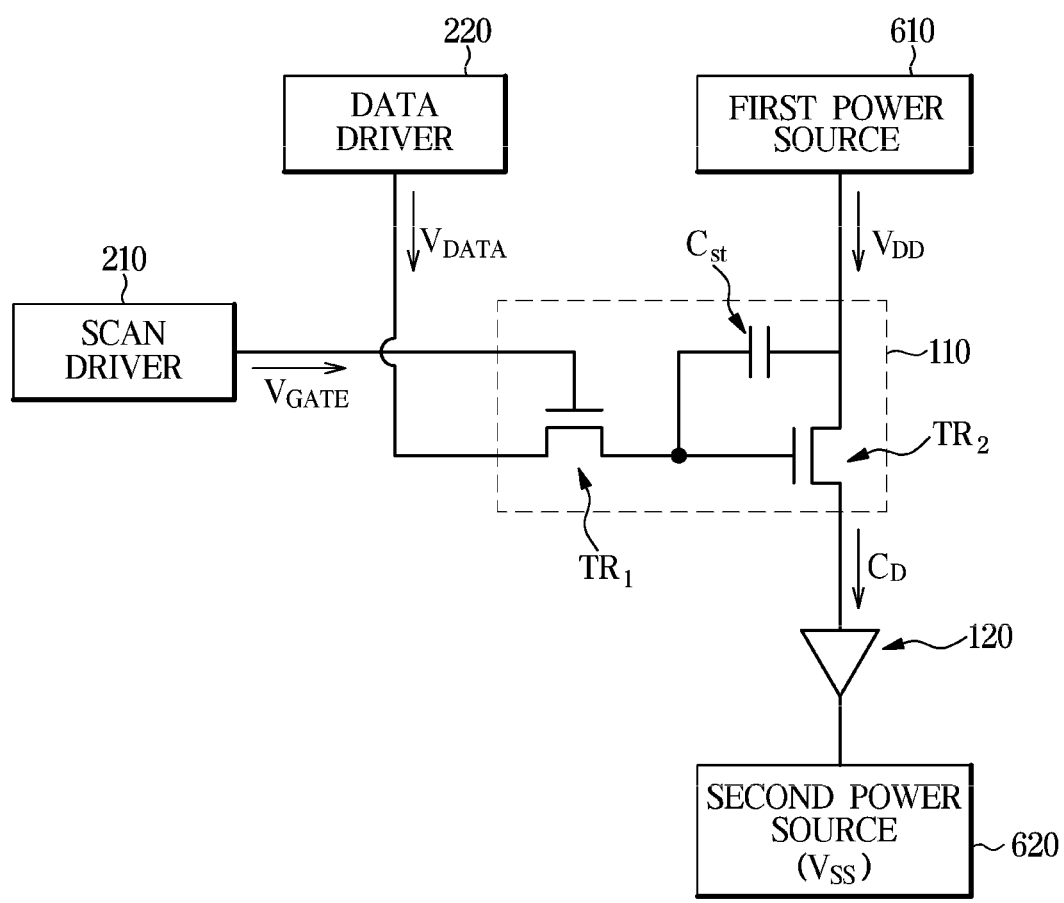
FIG. 6 is a circuit diagram schematically illustrating a pixel circuit for controlling a single subpixel in a display module according to an embodiment.

FIG. 6 is a circuit diagram schematically illustrating a pixel circuit for controlling a single subpixel in a display module according to an embodiment.

Referring to the example of FIG. 6, the pixel circuit 110 may include thin film transistors $T_{R1}$ and $T_{R2}$ for switching or driving the inorganic light emitting device 120 and a capacitor Cst.

For example, the thin film transistors $T_{R1}$ and $T_{R2}$ may include a switching transistor $T_{R1}$ and a driving transistor $T_{R2}$, and the switching transistor $T_{R1}$ and the driving transistor $T_{R2}$ may be implemented as P-channel metal-oxide-semiconductor (PMOS) transistors. However, embodiments of the display module 10 and the display apparatus 11 are not limited thereto, and the switching transistor $T_{R1}$ and the driving transistor $T_{R2}$ may be implemented as N-channel metal-oxide-semiconductor (NMOS) transistors.

In addition, the thin film transistors $T_{R1}$ and $T_{R2}$ may be low temperature polycrystalline silicon (LTPS) thin film transistors or oxide thin film transistors. In addition, the thin film transistors $T_{R1}$ and $T_{R2}$ may be amorphous silicon (a-Si) thin film transistors or single crystal thin film transistors.

For description purposes, a case in which the thin film transistors $T_{R1}$ and $T_{R2}$ are implemented as LTPS PMOS transistors will be described as an example in the embodiments to be described below.

The switching transistor $T_{R1}$ has a gate electrode connected to the scan driver 210, a source electrode connected to the data driver 220, and a drain electrode connected to one end of the capacitor $C_{ST}$ and a gate electrode of the driving transistor $T_{R2}$. The other end of the capacitor $C_{ST}$ may be connected to a first power source 610.

In addition, the driving transistor $T_{R2}$ has a source electrode connected to the first power source 610 for supplying a power voltage $V_{DD}$ and a drain electrode connected to an anode of the inorganic light-emitting device 120.

The inorganic light-emitting device 120 has a cathode connected to a second power source 620 for supplying a reference voltage $V_{SS}$. The reference voltage $V_{SS}$ may be a voltage lower than the power voltage $V_{DD}$, and a ground voltage or the like may be used as the reference voltage $V_{SS}$ to provide the ground.

The pixel circuit 110 of the above-described structure may operate as described below. First, when the gate voltage $V_{GATE}$ is applied from the scan driver 210 to turn the switching transistor $T_{R1}$ on, the data voltage $V_{DATA}$ applied from the data driver 220 may be transmitted to one end of the capacitor $C_{ST}$ and the gate electrode of the driving transistor $T_{R2}$.

A voltage corresponding to a gate-source voltage of the driving transistor $T_{R2}$ may be maintained for a predetermined time due to the capacitor $C_{ST}$. The driving transistor $T_{R2}$ may apply a driving current $C_D$ corresponding to the gate-source voltage to the anode of the inorganic light-emitting device 120, thereby causing the inorganic light-emitting device 120 to emit light.

However, the above-described structure of the pixel circuit 110 is merely an example applicable to the display module 10 according to one embodiment, and various circuit structures for switching and driving the plurality of inorganic light-emitting devices 120 may be applied to the display module 10 in addition to the above example.

Further, in this embodiment, a brightness control method of the inorganic light-emitting device 120 is not limited. The brightness of the inorganic light-emitting device 120 may be controlled by one of various methods, such as a pulse amplitude modulation (PAM) method, a pulse width modulation (PWM) method, and a hybrid method combining the PAM method and the PWM method, and the structure of the pixel circuit 110 may also vary according to the brightness control method.

Figure 7:
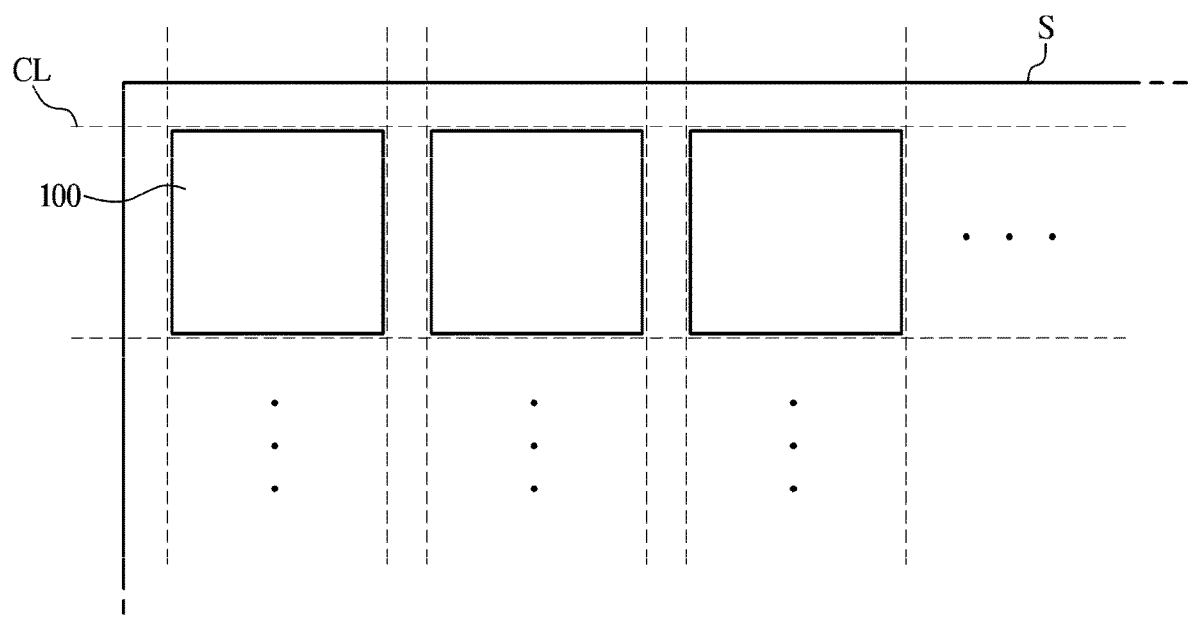
FIG. 7 is a diagram illustrating a display panel in a mother glass state in a process of manufacturing a display panel according to an embodiment.
Figure 8:
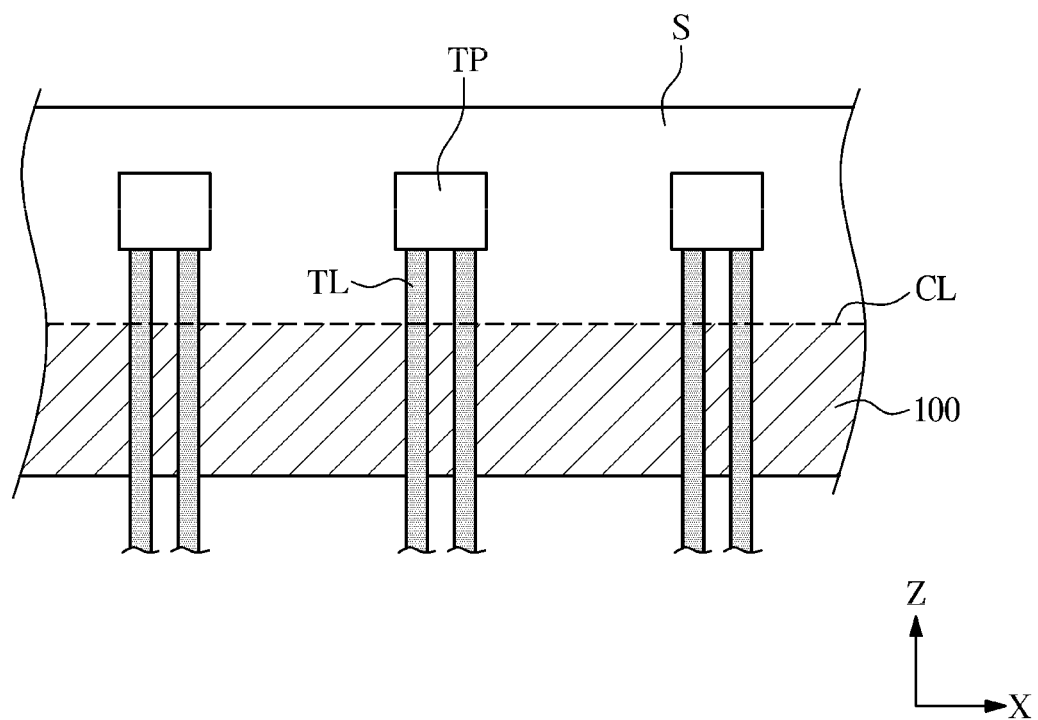
FIG. 8 is a diagram illustrating a test line and a test pad connected to a display panel in a mother glass state.

FIG. 7 is a diagram illustrating a display panel in a mother glass state in a process of manufacturing a display panel according to an embodiment. FIG. 8 is a diagram illustrating a test line and a test pad connected to a display panel in a mother glass state.

Referring to FIG. 7, as a method of manufacturing the display panel 100, pixel circuits 110 for driving a plurality of inorganic light emitting devices 120 are formed on a large mother substrate S, and the mother substrate S is cut along a cutting line CL, to obtain a plurality of display panels 100.

The display panel 100 obtained here may be a display panel 100 before the inorganic light emitting device 120 is mounted. For example, the inorganic light emitting device 120 may be mounted in a separate process of connecting each display panel 100 with the driver IC 200 to manufacture the display module 10.

That is, the process of manufacturing the display module 10 may include a process of forming the pixel circuits 110 on the mother substrate S and cutting the mother substrate S along the cutting line CL to obtain the display panel 100 and a process of mounting the inorganic light emitting devices 120 on the display panel 100 and connecting the driver IC 200.

In addition, the process of manufacturing the display apparatus 1 according to the embodiment may include the process of manufacturing the display module 10 described above and a process of connecting the timing controller 500, the main controller 300, the power board, and the like to the display module 10.

Referring to FIG. 8, a test line TL and a test pad TP for checking a defect of the display panel 100 may be provided on the mother substrate S. The test line TL may be connected to a signal line of the display panel 100, and a current flowing through the signal line may be obtained from the test pad TP through the test line TL. The signal line may include a data line for supplying a data signal, a gate line for supplying a gate signal, a power line for supplying power, and the like.

In the process of manufacturing the display panel 100, the inorganic light emitting device 120 may be mounted on the display panel 100 after a defect of the display panel 100 is checked based on a test current obtained from the test pad TP.

For example, the capacitance of the display panel 100 may be determined based on the test current obtained from the test pad TP. When the capacitance of the display panel 100 before the mounting of the inorganic light emitting device 120 exceeds a predetermined range, it may be determined that the display panel 100 is defective.

Figure 9:
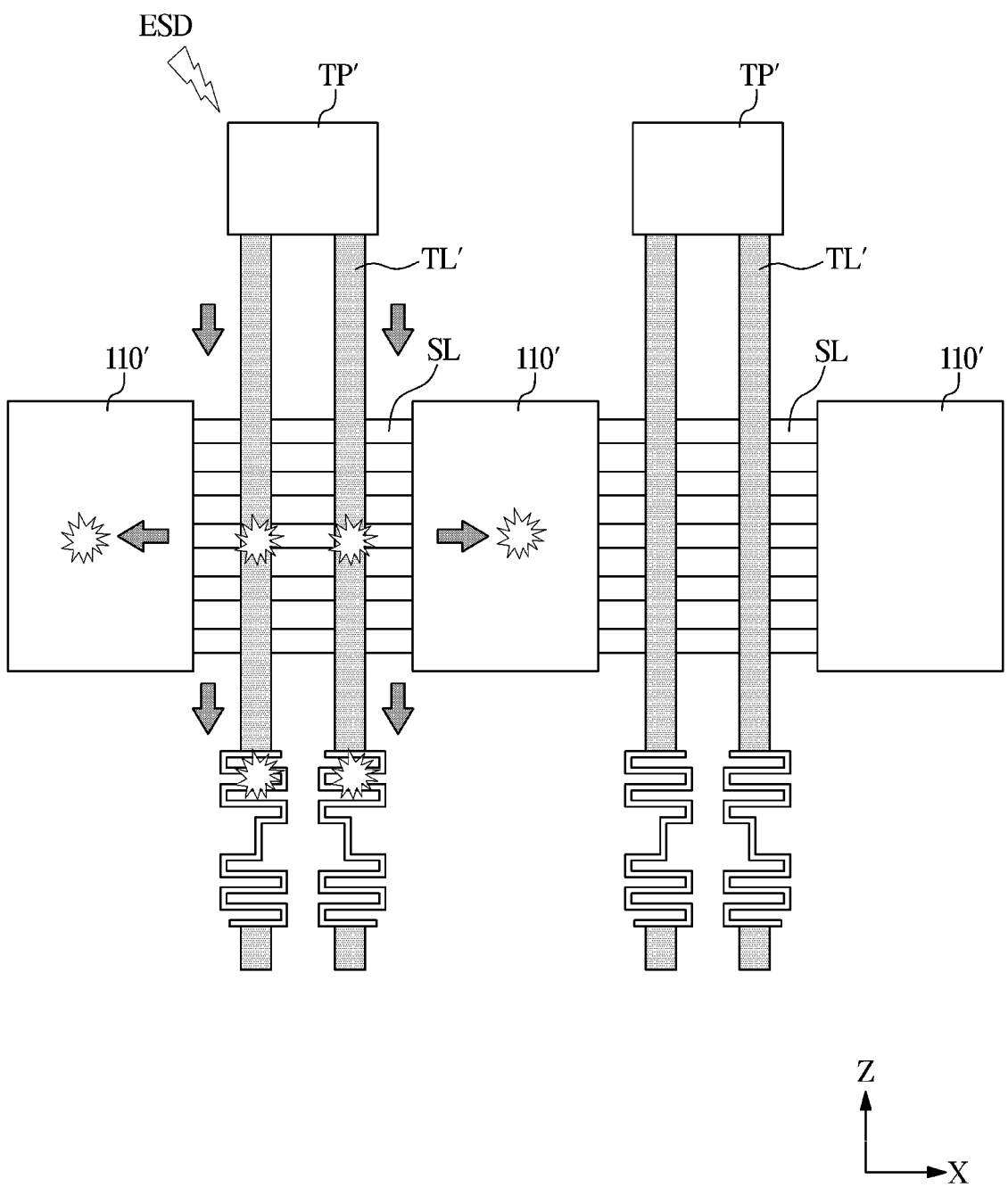
FIG. 9 is a diagram illustrating circuit damage due to static electricity flowing through a test line.

FIG. 9 is a diagram illustrating circuit damage due to static electricity flowing through a test line.

Referring to FIG. 9, when an electrostatic discharge (ESD) phenomenon occurs in a test pad TP' or a test line TL' in a manufacturing environment of a display module or display apparatus, elements of a pixel circuit 110 may be damaged.

The test line TL' and the signal line SL' may be formed on different layers, and an insulating layer may be formed between a layer in which the test line TL' is formed and a layer in which the signal line SL' is formed. Accordingly, even without a direct connection between the test line TL' and the signal line SL at a point in which the test line TL' and the signal line SL cross each other, when the voltage of the node is caused to rise above an dielectric breakdown voltage due to an ESD current flowing through the test line TL', the ESD current may also be applied to the pixel circuit 110', thereby damaging the circuit elements.

In particular, a curve section of the test line TL shown in the lower part of FIG. 9 is a section serving as a resistance, and when a high-speed ESD current enters the curve section, the voltage of the corresponding node momentarily rises, and the voltage rising above a dielectric breakdown voltage may cause dielectric breakdown in the periphery, so that circuit elements may be damaged.

Figure 10:
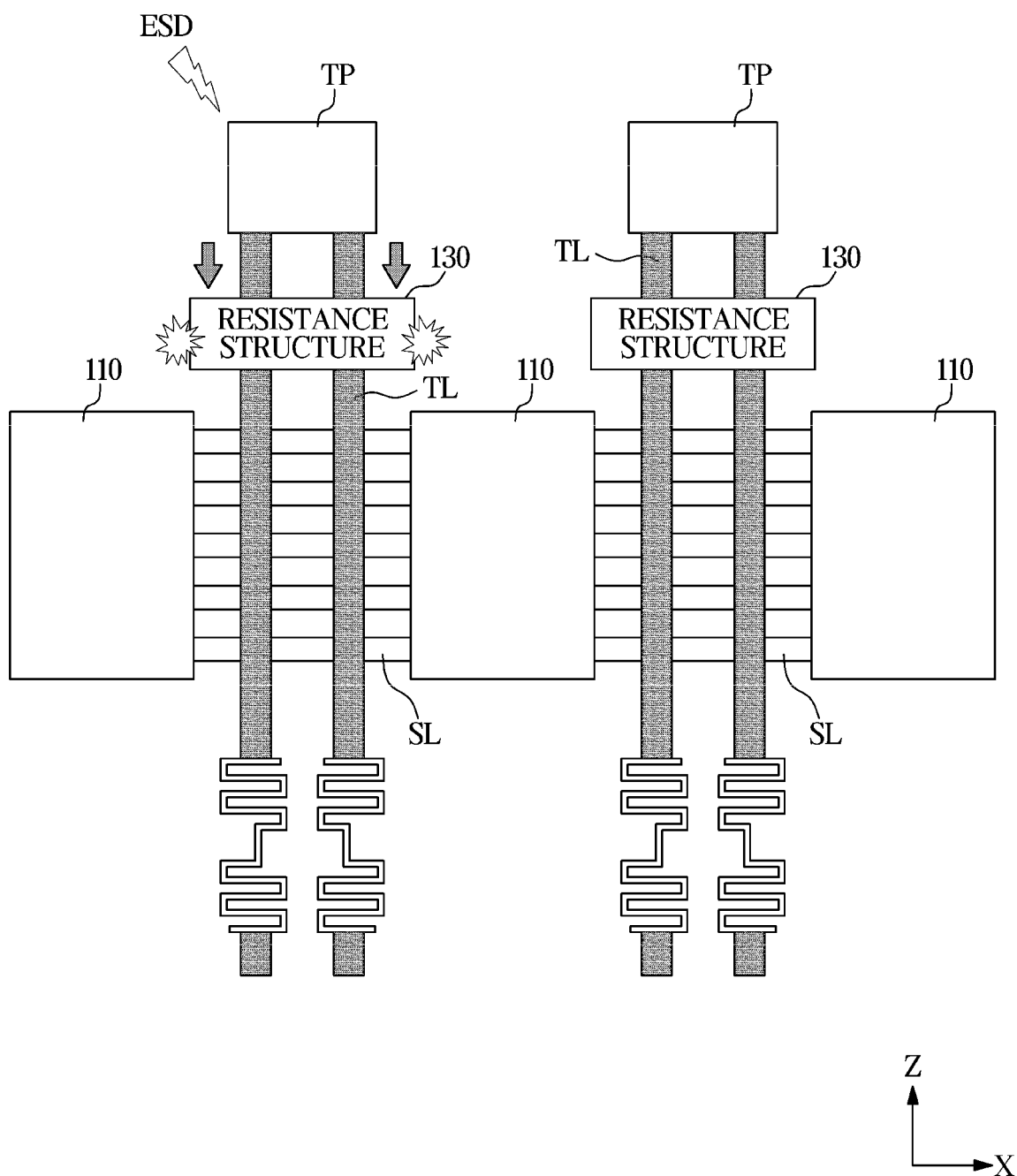
FIG. 10 is a diagram schematically illustrating a structure for preventing damage due to static electricity applied to a test line, in a process of manufacturing a display module according to an embodiment.

FIG. 10 is a diagram schematically illustrating a structure for preventing damage due to static electricity applied to a test line in a process of manufacturing a display module according to an embodiment.

In order to prevent the circuit from being damaged due to an ESD current flowing through the test line TL, a resistance structure 130 as shown in FIG. 10 may be provided in the display panel 100 according to an embodiment.

The resistance structure 130 may be provided on the test line TL, and specifically, between a point at which the test line TL and the signal line SL connected to the pixel circuits 110 cross each other and an end of the test line TL. Here, the end of the test line TL is a point, adjacent to the edge of the substrate 101, to which static electricity is introduced, and in a mother glass state, refers to a point at which the test line TL and the test pad TP are connected to each other, and in a single display panel state, refers to a cut surface of the test line TL.

As a high-speed ESD current flowing from the end of the test line TL meets the resistance structure 130, the voltage of the node is rapidly increased and dielectric breakdown occurs, thereby causing the corresponding section to be opened.

When such dielectric breakdown occurs at a point in which the test line and the signal line cross each other, an ESD current may flow into the signal line and circuit damage may occur. However, according to the embodiment, as shown in FIG. 10, the resistance structure 130 is provided ahead of the point in which the test line TL and the signal line SL cross each other, so that even when static electricity is introduced, the ESD current is prevented from being applied to the pixel circuit 110.

Figure 11:
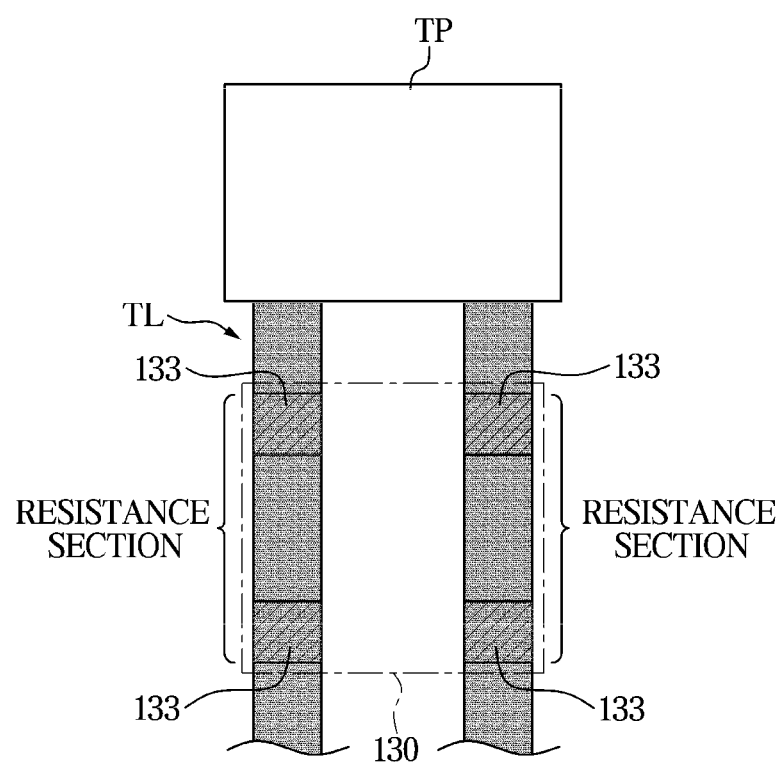
FIG. 11 is a plan view schematically illustrating an example of a resistance structure provided in a display panel according to an embodiment.
Figure 12:
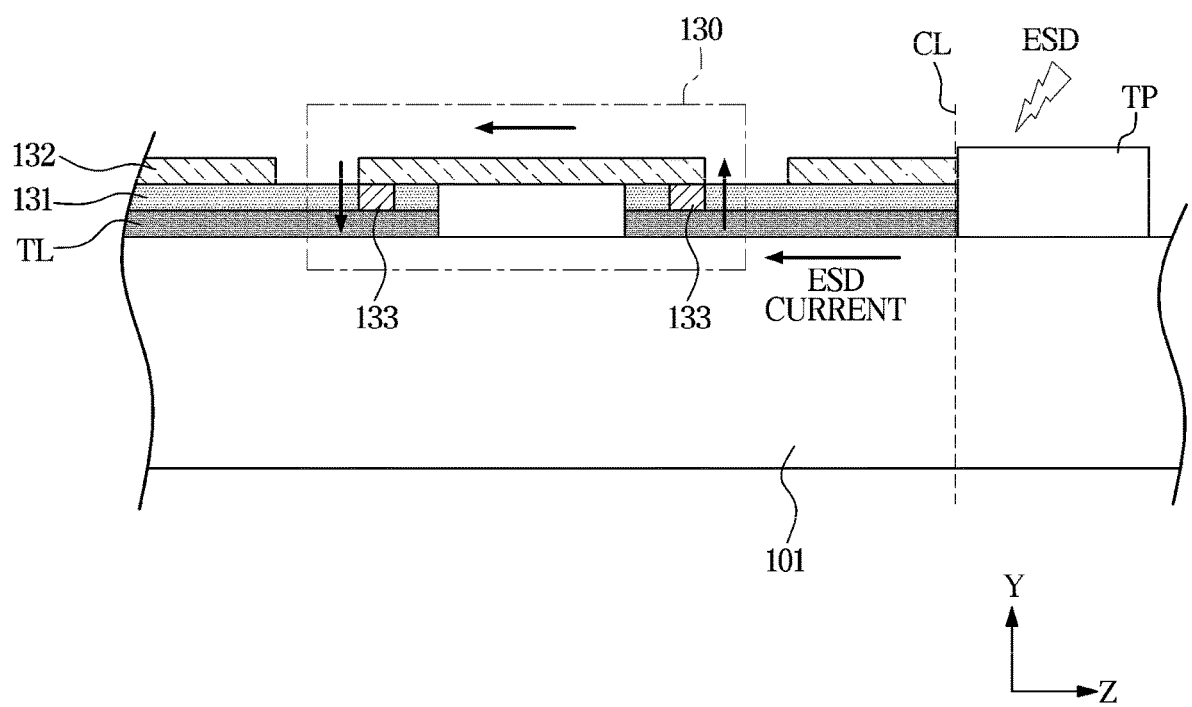
FIG. 12 is a side cross-sectional view schematically illustrating an example of a resistance structure provided in a display panel according to an embodiment.
Figure 13:
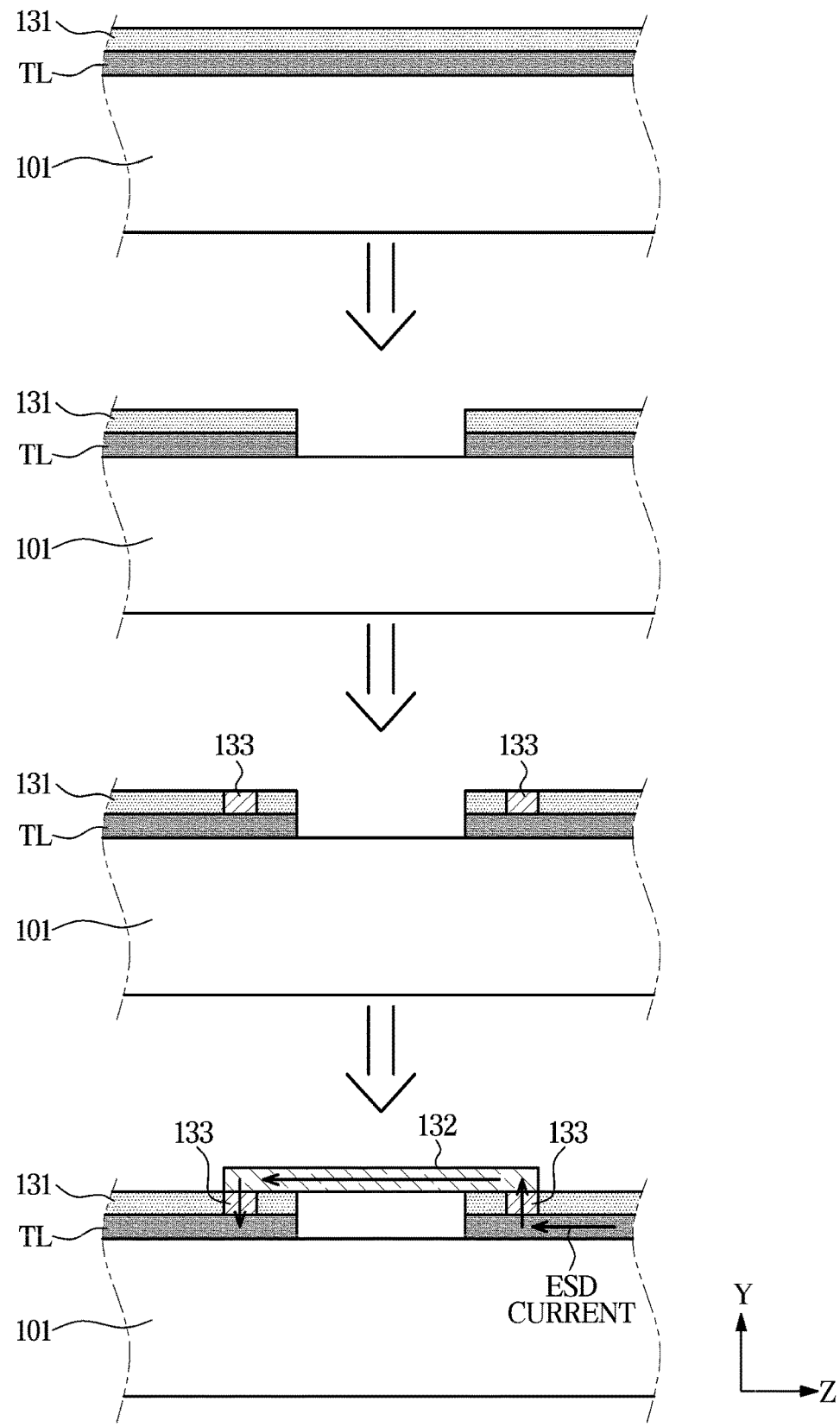
FIGS. 13 and 14 are diagrams illustrating a process of forming a resistance structure provided in a display panel according to an embodiment.
Figure 14:
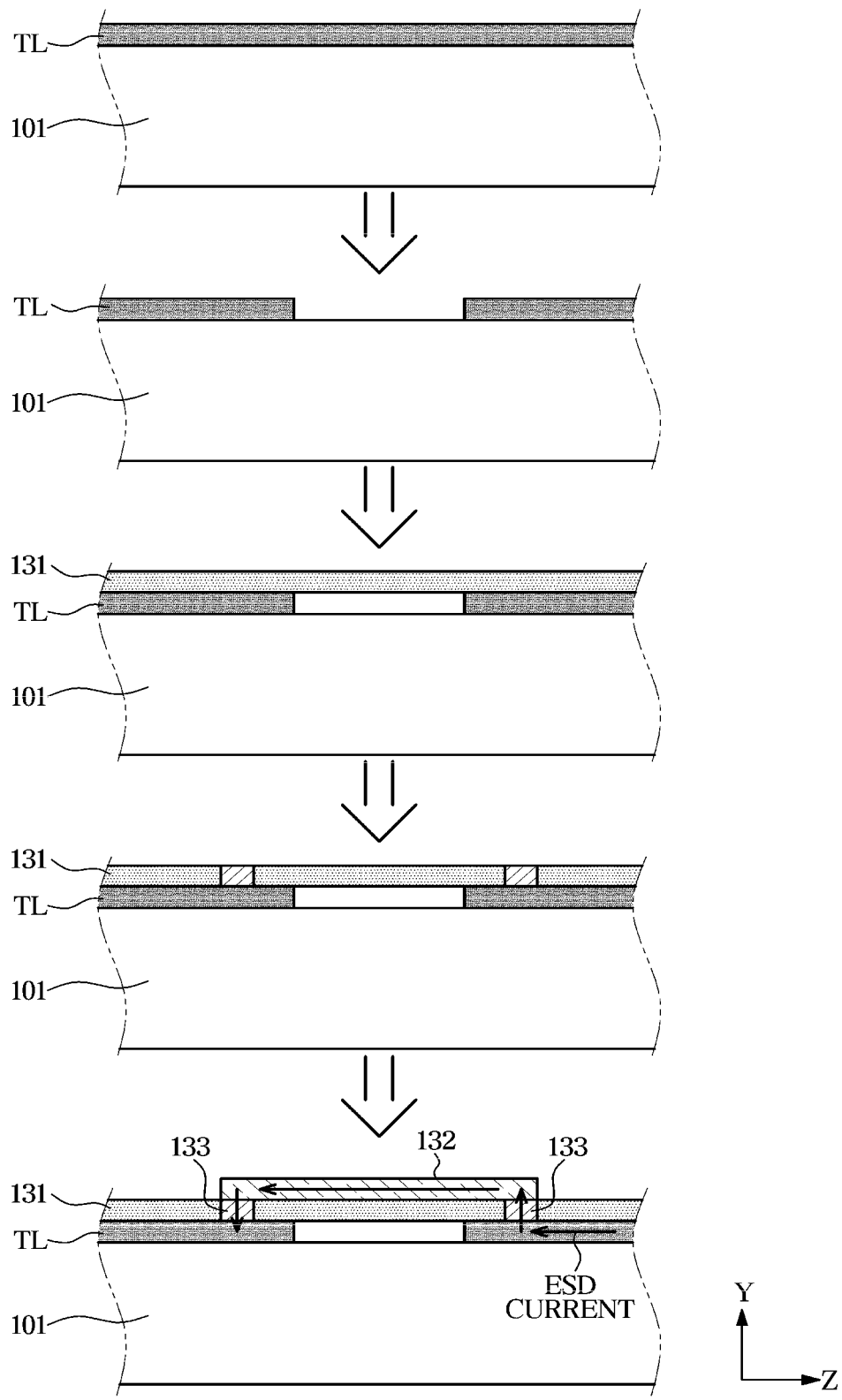
Figure 15:
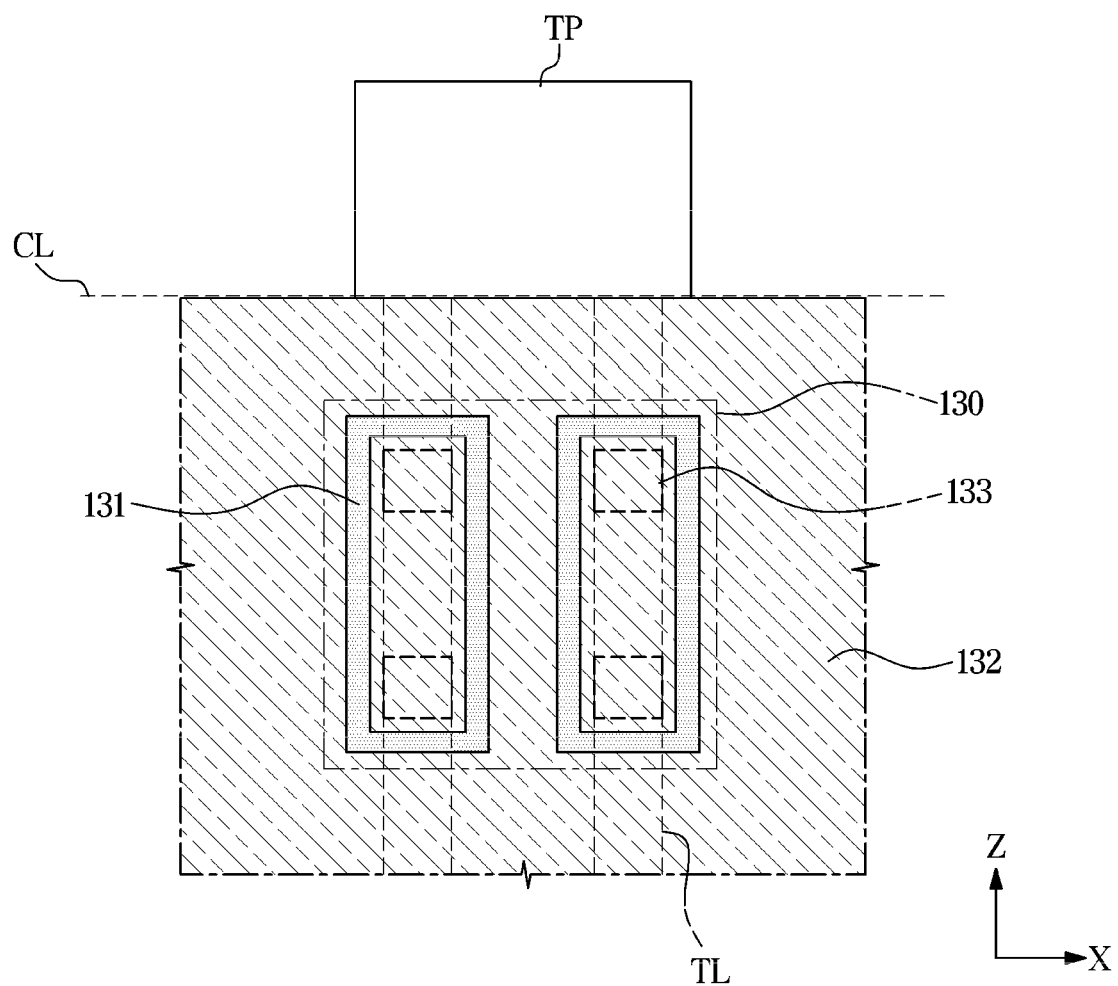
FIG. 15 is a plan view illustrating layers constituting an example of a resistance structure provided in a display panel according to an embodiment.

FIG. 11 is a plan view schematically illustrating an example of a resistance structure provided in a display panel according to an embodiment, FIG. 12 is a side cross-sectional view schematically illustrating an example of a resistance structure provided in a display panel according to an embodiment, FIGS. 13 and 14 are diagrams illustrating a process of forming a resistance structure provided in a display panel according to an embodiment, and FIG. 15 is a plan view illustrating layers constituting an example of a resistance structure provided in a display panel according to an embodiment.

Referring to FIG. 11, a vertical interconnect access (via) 133 is formed on the test line TL to switch paths such that the ESD current flowing into the test line TL flows to a material having a different electrical conductivity, which may increase the characteristic impedance of the section. Here, the material constituting the path switched by the via 133 may have a relatively high resistance in comparison with metal material constituting the test line TL. Accordingly, the section to which the path is switched may be referred to as a resistance section.

Referring to FIG. 12 together with FIG. 11, the insulating layer 131 may be formed on a test line layer in which the test line TL is formed, and the resistance layer 132 may be formed on the insulating layer 131.

The test line TL in a region corresponding to the resistance section may be cut out, and the ESD current flowing through the test line TL may be introduced into the resistance layer 132 through the via 133 in the resistance section. When a high-speed ESD current is introduced into the resistance layer 132, the corresponding section may be opened due to an abrupt voltage rise.

That is, since the section is opened ahead of the point at which the test line TL and the signal line SL cross each other, damage to the pixel circuit 110 due to the ESD current may be prevented.

Referring to FIG. 13, in the process of manufacturing the display panel 100, the test line TL may be formed on the substrate 101, and the insulating layer 131 may be formed on the test line TL.

For example, the test line TL may be formed by forming a metal material layer including at least one of copper, a copper alloy, aluminum, an aluminum alloy, molybdenum, or a molybdenum alloy on the substrate 101, performing a photolithography process including a procedure of photosensitive material application, exposure, development, and the like, and then performing an etching process for selectively removing undesired parts.

The insulating layer 131 may be formed of an organic insulating material or an inorganic insulating material, or may be formed by alternately using an organic insulating material and an inorganic insulating material.

The test line TL and the insulating layer 131 in the region corresponding to the resistance section are cut out, and the vias 133 passing through the insulating layer 131 are formed at a position ahead of the cut portion and a position behind the cut portion.

In order to form the via 133, a via hole passing through the insulating layer 131 may be formed, an inner wall of the formed via hole may be plated with a conductive material, such as copper, and then via filling may be performed by filling the via hole with a filling material. After the vias 133 are formed, the resistance layer 132 may be formed on the insulating layer 131.

The resistance layer 132 may provide resistance to various circuits provided in the display panel 100. In addition, the resistance layer 132 may provide a planarization surface and may block penetration of foreign substances or moisture. For example, the resistance layer 132 may be formed of a material, such as polysilicon, silicon oxide, silicon nitride, silicon oxynitride, aluminum oxide, aluminum nitride, titanium oxide, or titanium nitride.

The forming of the via 133 is switch the path of the ESD current flowing through the test line TL to the resistance section. However, when a test is performed on the display panel 100 in a mother glass state, the current flowing through the test line TL needs to reach the test pad TP according to the original purpose of the test line TL.

Accordingly, the vias 133 may include an entry via for guiding a current from the test line TL to the resistance section and an exit via for guiding a current from the resistance section back to the test line TL. Accordingly, at least two vias 133 may be formed at the position ahead of or at one end of the resistance section and behind or at the other end of the resistance section, respectively.

The current flowing through the test line TL may flow into the resistance section through the entry via and return to the test line TL through the exit via. The positions of the entry via and the exit via may be switched according to the direction of the current flowing through the test line TL.

As another example, referring to FIG. 14, the test line TL may be formed on the substrate 101, and before the insulating layer 131 is formed, the test line TL in a region corresponding to the resistance section may be cut out. Since the test line TL is cut out before the insulating layer 131 is formed, the region corresponding to the resistance section is also cut out during a process of etching the test line TL, the process efficiency is enhanced. When the forming and cutting of the test line TL are completed, the insulating layer 131 is formed on the test line TL, and the vias 133 passing through the insulating layer 131 are formed at the positions ahead of and behind the resistance section, respectively.

By forming the resistance layer 132 on the insulating layer 131 in which the vias 133 are formed, the current flowing through the test line TL may be allowed to flow into the resistance layer 132 through the vias 133 in the resistance section.

In the side cross sectional views of FIGS. 12, 13, and 14, only the layers constituting the resistance structure 130 or related to the resistance structure 130 are illustrated for the sake of convenience of description. However, it should be understood that layers provided on the substrate 101 may further include active layers, gate electrodes, drain electrodes, source electrodes and interlayer insulating layers therebetween for implementing the transistors $T_{R1}$ and $T_{R2}$ included in the pixel circuit 110, buffer layers, signal line layers, and other various layers required to perform a function as a display panel, and such layers may be also provided between the resistance structure 130 and the substrate 101, or may be provided on the resistance structure 130.

After forming the resistance layer 132 on the insulating layer 131, in order to form the resistance section in which a current flows between the two vias 133, a region of the resistance layer 132 between the two vias 133 may be trimmed to have a pattern corresponding to the test line TL, as shown in FIG. 15.

Figure 16:
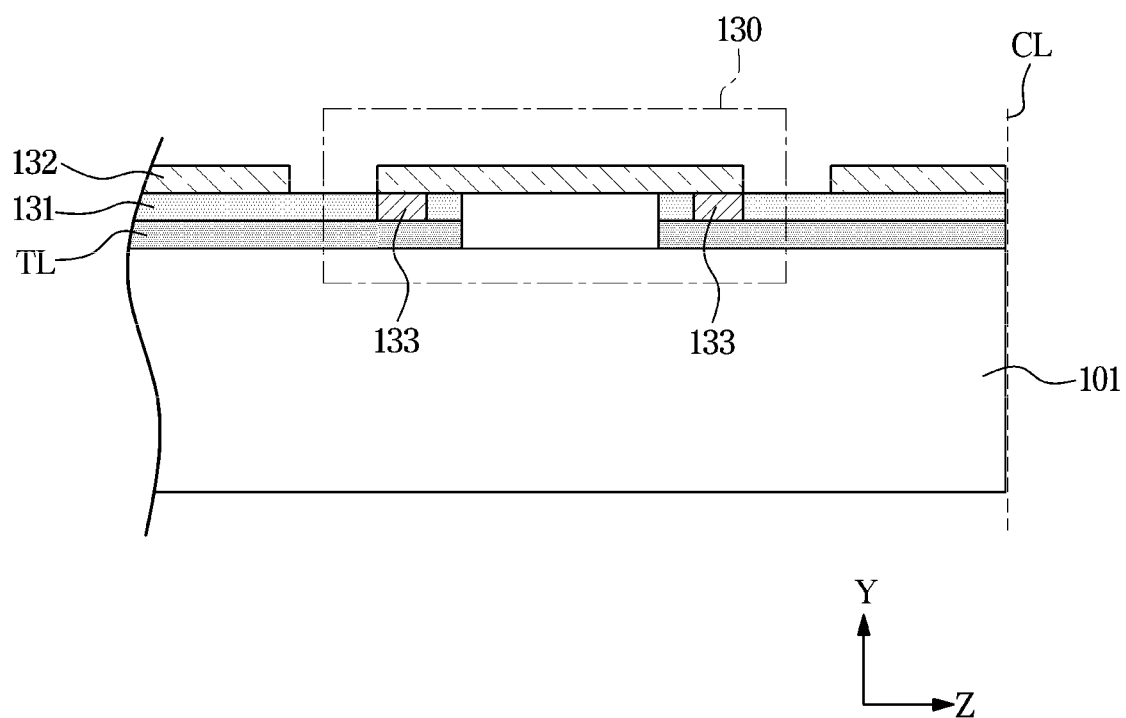
FIG. 16 is a side cross-sectional view illustrating a display panel, which shows a display panel cut in a mother glass state according to an embodiment.
Figure 17:
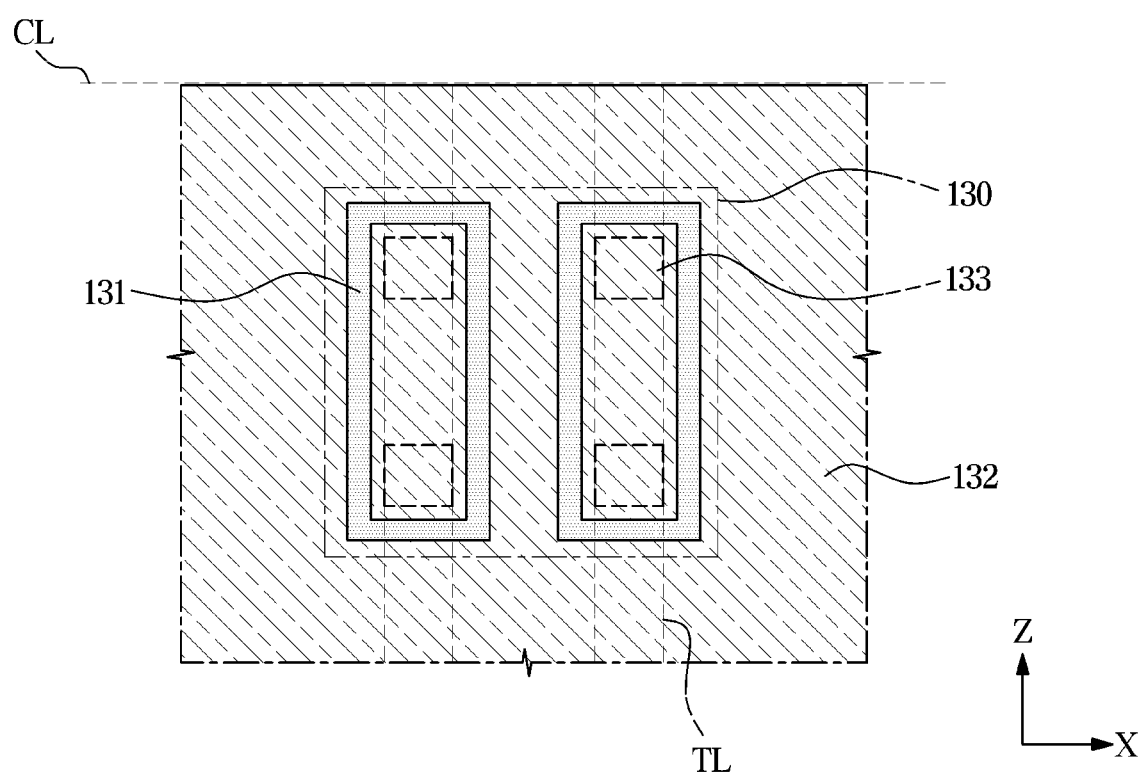
FIG. 17 is a plan view illustrating a display panel, which shows a display panel cut in a mother glass state according to an embodiment.

FIG. 16 is a side cross-sectional view illustrating a display panel cut in a mother glass state according to an embodiment, and FIG. 17 is a plan view illustrating a display panel cut in a mother glass state according to an embodiment.

As described above, a test for checking a defect in the display panel 100 may be performed using the test line TL and the test pad TP in a mother glass state before the inorganic light emitting device 120 is mounted, and when the test is completed, the mother substrate S may be cut along the cutting line CL to obtain a plurality of the display panels 100.

The cutting line CL is formed between an area in which the test pad TP is provided and an area in which the pixel circuits 110 are provided. That is, when the mother substrate S is cut along the cutting line CL after the test is completed, the test pad TP may be cut off and the cut surface of the test line TL may be exposed to the external environment as shown in FIGS. 16 and 17.

The cut surface of the test line TL positioned at the edge of the display panel 100 is prone to ESD. However, since the display panel 100 according to the embodiment is provided with the resistance structure 130 at a position adjacent to the cut surface of the test line TL or a position between a point at which the test line TL and the signal line SL cross each other and the cut surface of the test line T1, even when static electricity is introduced through the cut surface of the test line TL, the ESD current is not applied to the pixel circuit 110.

Therefore, the circuits may be protected from ESD generated in the test line TL even in the subsequent processes, such as mounting the inorganic light emitting device 120 on the cut display panel 100 after the mother glass state and connecting the driver IC 200.

On the other hand, since the test line TL provided to check a defect of the display panel 100 before the mounting of the inorganic light emitting device 120 does not affect the process after the completion of the test or the operation of the display panel 100, the test line TL may be allowed to be opened or destroyed after the test is completed.

Therefore, after the test using the test line TL is completed, a high-speed and high-voltage signal similar to the ESD waveform may be applied to the test pad TP to cause the test line TL to be opened, thereby preventing the pixel circuit 110 from being damaged by ESD current flowing through the test line TL in the subsequent process.

As in the above-described embodiment, when the resistance section may be provided at the end of the test line, even an introduction of static electricity into the edge of the substrate in the process of manufacturing the display panel, the process of manufacturing the display module, or the process of manufacturing the display apparatus may cause the corresponding resistance section to be opened, so that the static electricity does not exert an influence on the pixel circuit or the like arranged behind the resistance section.

In addition, without arranging a separate resistance device for providing a resistance section, ESD protection may be efficiently performed by forming a via in the basic structure of the display panel to switch the path of the current.

The above-described detailed description describes example embodiments of the disclosure, and the disclosure may be used through various other combinations, modifications, and environments. That is, the disclosure may be changed or modified within a range of the concept of the disclosure, a range equivalent to the disclosed contents, and/or a range of a technology or knowledge of the art. The above-described embodiments describe examples to realize the technical spirit of the disclosure, and various modifications required in specific application fields and uses of the disclosure may also be implemented. Therefore, the above-described detailed description of the disclosure is not intended to limit the disclosure in the disclosed embodiments. In addition, it should be interpreted that the range of the appended claims also includes other embodiments.

What is claimed is:

1. A display panel comprising:
   a substrate;
   a plurality of pixel circuits provided on the substrate and, each of the plurality of pixel circuits being configured to drive a respective inorganic light emitting device among a plurality of inorganic light emitting devices;
   a test line formed on a first layer of the substrate and extending from an edge of the substrate;
   a signal line formed on a second layer of the substrate and connected to the plurality of pixel circuits, the second layer being different from the first layer;

an insulating layer provided on the test line; and
a resistance structure provided on the test line, the resistance structure comprising:
- at least two vertical interconnect accesses (vias) passing through the insulating layer; and
- a resistance layer provided on the insulating layer and extending between the at least two vias, wherein the at least two vias connect the test line and the resistance layer to each other, and the test line is discontinuous at an area between the at least two vias, wherein the resistance layer is configured to receive, through one of the at least two vias, a current applied to the test line, wherein the insulating layer is formed on a test line layer in which the test line is formed, and the resistance layer is formed on the insulating layer, wherein the test line has an exposed end at the edge of the substrate, wherein the plurality of pixel circuits comprises a first pixel circuit configured to drive a first inorganic light emitting device among the plurality of inorganic light emitting devices, and a second pixel circuit configured to drive a second inorganic light emitting device among the plurality of inorganic light emitting devices, wherein the first pixel circuit is adjacent to the second pixel circuit in a first direction, wherein the signal line is extended from the first pixel circuit to the second pixel circuit in the first direction, wherein the test line is extended between the first pixel circuit and the second pixel circuit in a second direction perpendicular to the first direction such that the test line intersects with the signal line, and wherein the resistance structure is provided between the exposed end of the test line and a point at which the test line and the signal line cross each other.

2. The display panel of claim 1, wherein the resistance layer comprises a material having a resistance higher than a resistance of a material of the test line.

3. The display panel of claim 2, wherein the resistance layer comprises a resistance section corresponding to an area at which the test line is discontinued, and
the at least two vias are connected to opposite end portions of the resistance section.

4. The display panel of claim 3, wherein the resistance structure is configured to open due to an electro static discharge (ESD) current applied to the test line and introduced from the test line into the resistance section through the one of the at least two vias.

5. The display panel of claim 2, wherein the resistance layer comprises at least one of polysilicon, silicon oxide, silicon nitride, silicon oxynitride, aluminum oxide, aluminum nitride, titanium oxide, or titanium nitride.

6. The display panel of claim 1, wherein the exposed end of the test line is a cut surface corresponding to the edge of the substrate.

7. A display apparatus comprising:
a substrate;
a plurality of inorganic light emitting devices provided on the substrate;
a plurality of pixel circuits provided on the substrate, each configured to drive a respective inorganic light emitting device among the plurality of inorganic light emitting devices;
a test line formed on a first layer of the substrate and extending from an edge of the substrate;
a signal line formed on a second layer of the substrate and connected to the plurality of pixel circuits, the second layer being different from the first layer;
an insulating layer provided on the test line; and
a resistance structure provided on the test line, the resistance structure comprising:
- at least two vertical interconnect accesses (vias) passing through the insulating layer; and
- a resistance layer provided on the insulating layer and extending between the at least two vias, wherein the at least two vias connect the test line and the resistance layer to each other, and the test line is discontinuous at an area between the at least two vias, wherein the resistance layer is configured to receive, through one of the at least two vias, a current applied to the test line, wherein the insulating layer is formed on a test line layer in which the test line is formed, and the resistance layer is formed on the insulating layer, wherein the test line has an exposed end at the edge of the substrate, wherein the plurality of pixel circuits comprises a first pixel circuit configured to drive a first inorganic light emitting device among the plurality of inorganic light emitting devices, and a second pixel circuit configured to drive a second inorganic light emitting device among the plurality of inorganic light emitting devices, wherein the first pixel circuit is adjacent to the second pixel circuit in a first direction, wherein the signal line is extended from the first pixel circuit to the second pixel circuit in the first direction, wherein the test line is extended between the first pixel circuit and the second pixel circuit in a second direction perpendicular to the first direction such that the test line intersects with the signal line, and wherein the resistance structure is provided between the exposed end of the test line and a point at which the test line and the signal line cross each other.

8. The display apparatus of claim 7, wherein the resistance layer comprises a material having a resistance higher than a resistance of a material of the test line.

9. The display apparatus of claim 8, wherein the resistance layer comprises a resistance section corresponding to an area at which the test line is discontinued, and
the at least two vias are connected to opposite end portions of the resistance section.

10. The display apparatus of claim 9, wherein the resistance structure is configured to open due to an electro static discharge (ESD) current applied to the test line and introduced from the test line into the resistance section through the one of the at least two vias.

11. The display apparatus of claim 8, wherein the resistance layer comprises at least one of polysilicon, silicon oxide, silicon nitride, silicon oxynitride, aluminum oxide, aluminum nitride, titanium oxide, or titanium nitride.

12. The display apparatus of claim 7, wherein the exposed end of the test line is a cut surface corresponding to the edge of the substrate.

* * * * *